(12) United States Patent
Dovrtel et al.

(10) Patent No.: US 9,411,853 B1
(45) Date of Patent: Aug. 9, 2016

(54) IN-MEMORY AGGREGATION SYSTEM AND METHOD OF MULTIDIMENSIONAL DATA PROCESSING FOR ENHANCING SPEED AND SCALABILITY

(71) Applicant: Intelimedix, LLC, Tampa, FL (US)

(72) Inventors: Michal Dovrtel, Brno (CZ); Vaclav Dovrtel, Troskotovice (CZ); Vladimir Havlena, Cerna Hora (CZ)

(73) Assignee: Healthstudio, LLC, Lakeland, FL (US)

( * ) Notice: Subject to any disclaimer, the term of this patent is extended or adjusted under 35 U.S.C. 154(b) by 177 days.

(21) Appl. No.: 13/955,771

(22) Filed: Jul. 31, 2013

Related U.S. Application Data

(60) Provisional application No. 61/679,224, filed on Aug. 3, 2012.

(51) Int. Cl.
*G06F 17/30* (2006.01)
(52) U.S. Cl.
CPC .............................. *G06F 17/30477* (2013.01)
(58) Field of Classification Search
CPC ............. G06F 17/30333; G06F 17/30539; G06F 17/30607; G06F 17/3069
USPC ......................... 707/769, 812, 955
See application file for complete search history.

(56) References Cited

U.S. PATENT DOCUMENTS

| | | | |
|---|---|---|---|
| 5,884,299 A | 3/1999 | Ramesh et al. | |
| 6,182,061 B1 | 1/2001 | Matsuzawa et al. | |
| 6,865,567 B1 * | 3/2005 | Oommen et al. | |
| 7,272,612 B2 | 9/2007 | Birdwell et al. | |
| 7,376,656 B2 | 5/2008 | Blakeley et al. | |
| 7,882,106 B2 | 2/2011 | Birdwell et al. | |
| 8,090,751 B2 | 1/2012 | Saffer et al. | |
| 8,374,986 B2 | 2/2013 | Indeck et al. | |
| 8,452,804 B2 | 5/2013 | Bakalash et al. | |
| 2002/0029207 A1 | 3/2002 | Bakalash et al. | |
| 2006/0155915 A1 | 7/2006 | Pereira | |
| 2008/0040348 A1 * | 2/2008 | Lawande et al. | 707/7 |
| 2011/0153548 A1 | 6/2011 | Varghese et al. | |
| 2012/0011144 A1 | 1/2012 | Transier et al. | |

(Continued)

FOREIGN PATENT DOCUMENTS

| | | |
|---|---|---|
| EP | 2469423 A | 6/2012 |
| KR | 101245994 B1 | 3/2013 |
| WO | 2004040447 A | 5/2004 |

OTHER PUBLICATIONS

Ambuj Shatdal, Jeffrey FL Naughton; "Adaptive Parallel Aggregation Algorithms", Computer Sciences Department, University of Wisconsin, Madison.

(Continued)

*Primary Examiner* — Fred I Ehichioya
*Assistant Examiner* — Johnese Johnson
(74) *Attorney, Agent, or Firm* — Carl M. Napolitano; GrayRobinson, P.A.

(57) ABSTRACT

An in-memory aggregation (IMA) system having a massive parallel hardware (HW) accelerated aggregation engine uses the IMA for providing maximal utilization of HW resources of any processing unit (PU), such as a central processing unit (CPU), general purpose GPU, special coprocessors, and like subsystems. The PU accelerates business intelligence (BI) application performance by massive parallel execution of compute-intensive tasks of in-memory data aggregation processes.

22 Claims, 11 Drawing Sheets

(56) References Cited

U.S. PATENT DOCUMENTS

2012/0047126 A1 2/2012 Branscome et al.
2012/0054236 A1 3/2012 Branscome et al.
2012/0117027 A1 5/2012 Shau et al.
2013/0031053 A1 1/2013 Tobin et al.

OTHER PUBLICATIONS

Bingsheng He, Mian Lu, Ke Yang, Rui Fang, Naga K. Govindaraju, Qiong Luo, Pedro V. Sander; "Relational Query Co-Processing on Graphics Processors"; Hong Kong University of Science and Technology; 2009.

Changkyu Kim, Jatin Chhugani, Nadathur Satish, Eric Sedlar, Anthony D. Nguyen, Timothy Kaldewey, Victor W. Lee, Scott A Brandt, Pradeep Dubey; "FAST: Fast Architecture Sensitive Tree Search on Modern CPUs and GPUs"; SIGMOD 2010, Jun. 6-11, 2010, Indianapolis, Indiana.

Duane Merrill, Andrew Grimshaw; "High Performance and Scalable Radix Sorting: A Case Study of Implementing Dynamic Parallelism for GPU Computing"; Department of Computer Science, University of Virginia, Charlottesville, Virginia; Jan. 2011.

Jens Albrecht, Wolfgang Sporer; "Aggregate-Based Query Processing in a Parallel Data Warehouse Server"; Department of Database Systems, University of Erlangen-Nuremberg; Martensstr; 3, 91058 Erlangen, Germany.

K.V.M. Naidu, Rajeev Rastogi, Scott Satkin, Anand Srinivasan; "Memory-Constrained Aggregate Computation Over Data Streams".

Krzysztof Kaczmarski; "Comparing CPU and GPU in OLAP Cube Creation"; SOFSEM 2011; Faculty of Mathematics and Information Science, Warsaw University of Technology; Jan. 22-28, 2011.

Peter Bakkum, Kevin Skadron; "Accelerating SQL Database Operations on a GPU with CUDA"; Department of Computer Science, University of Virginia, Charlottesville, VA; GPGPU—3, Mar. 14, 2010, Pittsburg, PA.

Robert J. Kopaxzyk; "Scalable In-Memory Aggregation"; Imperial College London; Department of Computing; Jun. 21, 2011.

Rui Fang, Bingsheng He, Mian Lu, Ke Yang, Naga K. Govindaraju, Qiong Luo, Pedro V. Sander; "GPUQP: Query Co-Processing using Graphics Processors"; The Hong Kong University of Science and Technology; SIGMOD 2007, Jun. 11-14, 2007, Beijing, China.

Scott Schneider, Henrique Andrade, Bugra Gedik, Kun-Lun Wu, Dimitrious S. Nikolopoulos; "Evaluation of Streaming Aggregation on Parallel Hardware Architectures"; DEBS 2010, Jul. 12-15, 2010, Cambridge, UK.

Tayler H. Hetherington, Timothy G. Rogers, Lisa Hsu, Mike O'Connor, Tor M. Aamodt; "Characterizing and Evaluating a Key-Value Store Application on Heterogenious CPU-GPU Systems"; Department of Electrical and Computer Engineering, University of British Colombia, Vancouver, BC, Canada.

Tim Kaldewey, Guy Lohman, Rene Mueller, Peter Volk; "GPU Join Processing Revisited"; Proceedings of the Eighth International Workshop on Data Management on New Hardware, DaMoN 2012, May 21, 2012, Scottsdale, AZ.

\* cited by examiner

IN-MEMORY AGGREGATION SYSTEM AND METHOD OF MULTIDIMENSIONAL DATA PROCESSING FOR ENHANCING SPEED AND SCALABILITY

CROSS-REFERENCE TO RELATED APPLICATIONS

This application claims priority to U.S. Provisional Patent Application No. 61/679,224 filed on Aug. 3, 2012, for Hardware Accelerated In-Memory Aggregation System for Business Intelligence Analysis, the disclosure of which is hereby incorporated by reference herein in its entirety, and commonly owned.

FIELD OF THE INVENTION

The present invention generally relates to business intelligence analysis and in particular to providing a desirable speed and scalability in data processing, analysis and storage.

BACKGROUND

Business Intelligence (BI) analysis of very large data (often referred to as "big data") and a rapidly increasing number of users are presenting challenges for BI vendors, as well as database engine vendors. Traditional hardware (HW) concepts, such as Row-based databases and multidimensional on-line analytical processing (OLAP) approaches utilizing current HW do not provide sufficient speed and scalability to respond to current BI challenges, and thus a need exists.

By way of example, there is a need for speed and flexibility in ad-hoc reporting, big data analysis, scalability in terms of number of concurrent users, and processing complexity of business data models in a current dynamically changing environment.

SUMMARY

Embodiments of the present invention provide BI systems and methods based upon years of development and experience with BI tools. Embodiments of the invention provide comprehensive solutions to current challenges for business intelligence (BI) tools and environment including providing speed and flexibility of Ad-Hoc reporting, providing ease in handling big data analysis, scalability in terms of number of concurrent users, and complexity of business data model in current dynamically changing environment. Embodiments of the invention are represented by unique combinations of unique features that are designed to address and answer challenges known in the art.

Embodiments according to the teachings of the present invention provide In-Memory Aggregation (IMA) systems having a Massive Parallel HW accelerated aggregation engine using in-memory aggregation. As such, a desirable solution based on maximal utilization of HW resources for both a central processing unit (CPU) and a dedicated processing unit (PU), such as a GPU, special coprocessors, and the like subsystems (here and after referred as the PU). The PU accelerates BI application performance by massive parallel execution of the compute-intensive tasks of in-memory data aggregation process.

According to the teachings of the present invention, big data may be stored in a file system of a "data crunching" computer, yet not as in a traditional Relational Database as is common in typical BI solutions. Further, data is stored in columnar form and is fully horizontally and vertically partitioned to allow the data to be processed in a fully distributed environment, such as in computer clouds.

An Analytical Query Language (AQL) is provided according to the teachings of the present invention. The AQL has a "clean" design without necessary exclusions such as is typically dictated by architecture of data storage (i.e. like other solutions as in materialized multidimensional cubes). The AQL is optimized for general multidimensional data analysis.

One system according to the teachings of the present invention may comprise a fully integrated business layer with query execution and a backend system portion having features including a closely integrated AQL language and a Query Tree decomposition engine (not a general purpose query and aggregation engine as is typically found in the art).

An automated query generator provides Logical Query decomposition accordingly to a Logical Data model. A user's report query is automatically decomposed to a tree of logical multidimensional objects, each defining a specific subspace of the whole multidimensional space. This query can be optimized by "pruning" using algebraic and heuristic rules. From a logical data model point of view, the query represents a new multidimensional space. A desirable solution is provided by an optimized logical query decomposition system optimized for denormalized data stored in columnar storage.

A Macro generator executes a transformation of the tree of logical multidimensional objects into a Macro Language representing the physical execution plan of the projection of metrics into multidimensional subspaces defined by an ad-hoc report. With macro definitions being fully controllable, the system may easily be enhanced to deploy other special processing tasks such as statistical tasks, post processing tasks for customized reports display, and the like. The system is not dependent on predefined sort keys materialized in advance. A Macro code is transformed into the hardware accelerated execution code, which supports massive parallel processing within a single system or within the hardware cloud. As a result, a unique system id provided. By way of example, there is no other automated query tree generator that automatically generates query optimized only for data stored in a columnar manner residing in a file system.

A Query Execution is improved by utilization of multilevel caching system which allows re-use of previously calculated reports and their temporary results. Additional report retrieval speed may be achieved by extensive caching of metric results, compressed keys and constrain masks. The system recognizes a given run query (or parts of a query) that has been already calculated. Instead of re-executing the entire query, the results or a part of the results are pulled from the cache. Typical multilevel caching systems on the BI tools market do not or cannot automatically generate and then reuse multidimensional subspaces stored in columnar way directly residing in the file system of execution work stations. The multidimensional data repository, according to the teachings of the present invention, has enough flexibility to create a huge number of derived subspaces such that subspaces can be utilized not only by whole reports, but also by low level componential aggregation tasks that are used for data retrieval of completely different reports with different metrics, than reports for which these low level caches were originally created.

In-memory aggregation logic is designed to take full advantage of massive parallel HW components and therefore a special implementation of MapReduce concepts (further detailed below) has been designed for aggregation task using massive parallel processing.

A fully modular processing system is designed for scalable cloud computation with separate dedicated commodity computers for each of the below functions. There has not been any similar cloud environment of in-memory aggregation servers with dedicated, role based systems running in parallel data aggregation tasks not only in commodity MPP system of a single system, but also simultaneously on multiple servers in the cloud. This high degree of parallelisms is described in more details below. This parallelism allows one to run one single, low level aggregation task across all the available machines in the cloud. Thus unbeatable performance can be achieved and thus provides a most desirable solution for big data analysis known to date. To be able to do that, individual work stations in the cloud are assigned to their individual roles including the following, by way of example.

Data crunching: An example includes Multiple Workstations are each capable of processing data aggregation tasks on a particular PU. There can be multiple Data Crunching Workstations to support scalability requirements for supporting larger concurrent user communities while still maintaining the excellent response time for ad hoc reports.

Metadata Serving: An example includes separate metadata servers providing extra performance for both backend and client applications to search for business metadata objects. With such separation, there is no performance degradation on data crunching Workstations in the In-Memory Aggregation (IMA) cloud.

Aggregation tasks supervising and controlling: An example includes query management and distribution tasks being placed on a separate (e.g., dedicated) server. This allows additional scalability to support a larger user basis via the IMA cloud. The fast query management process is not impacted by the other activities as described above.

By way of further example, one embodiment may provide an In-Memory Aggregation (IMA) system having a HW accelerated aggregation engine using in-memory aggregation. As such, a desirable solution based on maximal utilisation of HW resources for a particular PU. The multiple PU accelerates BI application performance by massive parallel execution of the compute-intensive tasks of in-memory data aggregation process.

Desirable benefits may include, from a user's perspective, applications run significantly faster because of the massively parallel processing power of the PU to boost performance of business intelligence analytics and reporting over large amount of data. Extraordinary performance is thus achieved on commodity hardware. Further, there is no need to compromise analytics depths and breadth by minimizing data size as required in traditional OLAP systems. Embodiments of the present invention allow execution "drill downs" anywhere on virtually any data breadth and depth (1 bil. rows+ by way of example).

BRIEF DESCRIPTION OF THE DRAWINGS

Embodiments of the invention are described by way of example with reference to the accompanying drawings in which.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

Figure 1:
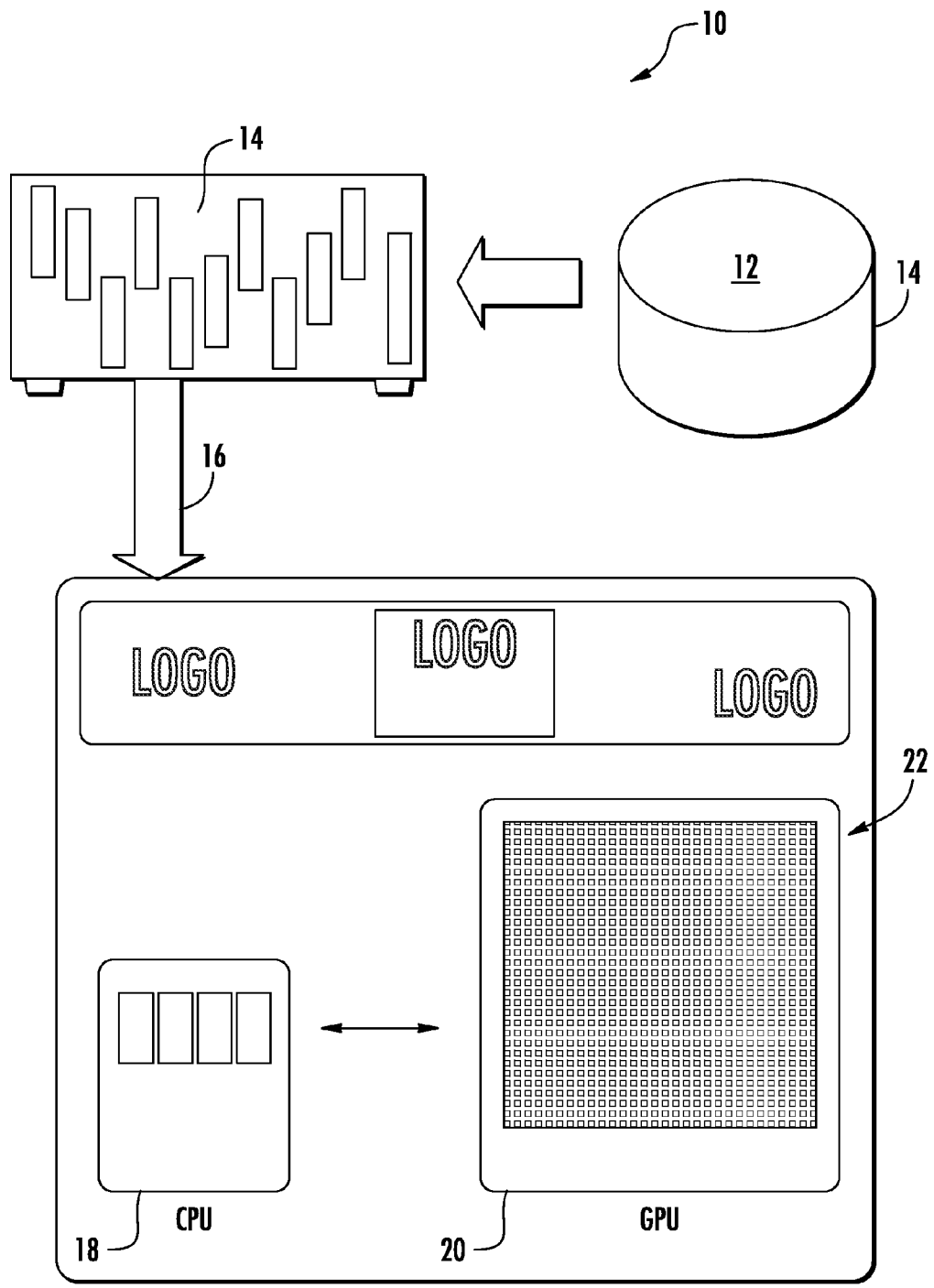
FIG. 1 is a diagrammatical illustration of data processing flow for one in-memory aggregation engine according to the teachings of the present invention.

With reference initially to FIG. 1, an HW accelerated In-Memory Aggregation (IMA) system includes multiple process steps of data preparation and in-memory aggregation. Implementation utilizes state-of-art technology concepts, including by way of example, a constant time processing approach; a map/reduce styled concept of distributed computing; in-memory processing; and "CPU Cache friendly" algorithms.

By way of example, data storing and processing is based on an open computer language (OpenCL) designed for massive parallel processing, and Perl Data Language (PDL). As is known in the art, Open Computing Language (OpenCL) is a framework for writing programs that execute across heterogeneous platforms consisting of multiple processing units (PUs). The PDL provides a "Data Crunching" library originally intended for large image data processing.

Embodiments of the in-memory aggregation system and method, as herein described according to the teachings of the present invention, together with features of selected technology result in desirable benefits including: query response predictability and stability; scalability; reduced data storage volume requirements, limits random access on HDD; fast materialization of LDM changes; simple implementation of advance functions (e.g. median, running sums etc.); and simple third party C/C++ library integration (e.g. R Project, GSL, BOOST, . . . ).

With reference initially to FIG. 1, one process and system 10 for HW accelerated in-memory aggregation includes data preparation and in-memory aggregation. Data is placed in data storage DW 12 as relational dimensional data, and stored in vectors (called clusters of PIDLs) 14 with values identified by sets of keys, as will be further detailed later in this disclosure. By way of example, a ROLAP engine 16 dynamically transforms a report request into an execution plan, wherein the report data request is submitted to the local vector data store. The data vectors, needed for a query, are sent to a CPU 18, by way of example. The vectored query data are then sent from the CPU to a GPU 20, by way of example, for an initial phase aggregation process to start. By way of example, the CPU 18 may include number of CPU cores in the order of singles or tens, while the GPU 20 includes number of cores in the order of hundreds or thousands. Together, the CPU 18 and the GPU 20 operate to process ("crunch") through the data in the in-memory aggregation process, as further detailed later, by way of example. Generally, the aggregation is not finished in the GPU 20, as the aggregation over several final aggregation levels is executed in the GPU. The original data, stored in DW 14 as relational, multidimensional data are denormalized and the denormalized data are structured into partitions. The massively parallel processing power of the GPU 20 boosts performance of the data aggregation process. An in-memory aggregation module utilizes performance of the parallel GPU 20 architecture using a parallel programming model. The aggregation process, over multi millions of data elements, is distributed among hundreds of GPU cores to take advantage of the parallel processing. The aggregation process is executed in levels. A "smart" aggregation process controller makes decisions which aggregation levels to be executed in a particular PU.

By way of example with regard to exporting data, original data is stored in the relational database of the underlying data warehouse (DW) 14 in a normalized form modeling a multidimensional hierarchical structure (after the extract, transfer, and loading (ETL) process is finished). To fully utilize massive parallel processing, data are exported to an data crunching computer. Part of the data export phase includes a change of the data structure from a normalized format to a fully denormalized format while keeping its relation, such as a multidimensional nature necessary in analysis of BI tasks. Another part of data export is changing the row-based structure, typical for standard relational database management system (RDBMS) engines, to columnar structure (e.g. set of data vectors).

By way of example with regard to main storage data importing, vector data are partitioned and loaded into a local disk drive of an data crunching computer. The data are partitioned both vertically into column vectors and horizontally to form into data chunks. Such partitioning is executed for increasing the processing speed of the in-memory aggregation; and providing an ability to aggregate very large data while not being limited by local memory of GPGPU, as well as computer random access memory (RAM). Vector data is stored in PDL data objects (a/k/a piddles). The piddles with a same level of aggregation are associated into the same PDL cluster. Each vector data chunk is stored in an individual physical file.

A report is defined using attributes (e.g. aggregation level), metrics (e.g. business data measurements) and filtering criteria utilizing AQL language.

Figure 2:
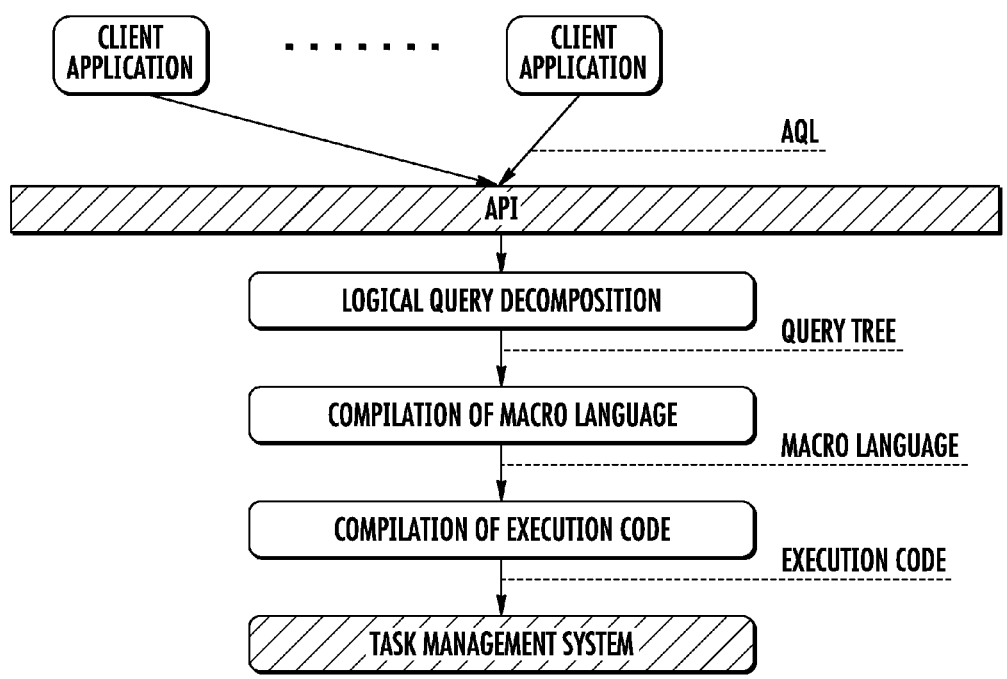
FIG. 2 is a flow chart illustrating a report execution process, wherein at a beginning stage, a relational OLAP (ROLAP) engine dynamically transforms a report request into an execution plan, and then is followed up by an execution itself.

During the report execution process, and at a beginning stage, the relational OLAP (ROLAP) engine 13 dynamically transforms a report request into an execution plan (as illustrated with reference to FIG. 2.), and then is followed up by an execution itself. By way of example, the following process steps may be performed:

1. Logical Query decomposition—The user's report query is decomposed to a tree of the logical multidimensional objects (as illustrated with reference to FIG. 2A.) by evaluation of directed graph presentation of logical data model (as will be later described with reference to FIG. 8, by way of example), each defining specific subspace of the whole multidimensional space. This query tree can be optimized by "pruning" using algebraic and heuristic rules.

2. Compilation of Macro Language definition—each multidimensional subspace definition is translated into macro Language. The Macro Language generator evaluates metadata of physical data storage and is able to utilize already prepared multidimensional data spaces to optimize execution plan. Each macro procedure is specified by set of parameters: aggregation, filtering, metric, dependency on other macros, and the like, by way of example. Examples of Macro types include: Prepare Buffer; Prepare Attribute; Prepare Constraint; Reduce partial result combination macros; Write; Aggregate; and the like.

3. Execution phase starts by a translation of Macro Language into a parallelized Execution Code. The plan of parallel execution is prepared accordingly to available hardware resources.

4. Executing aggregation tasks (driven by Task Management System)

Figure 2A:
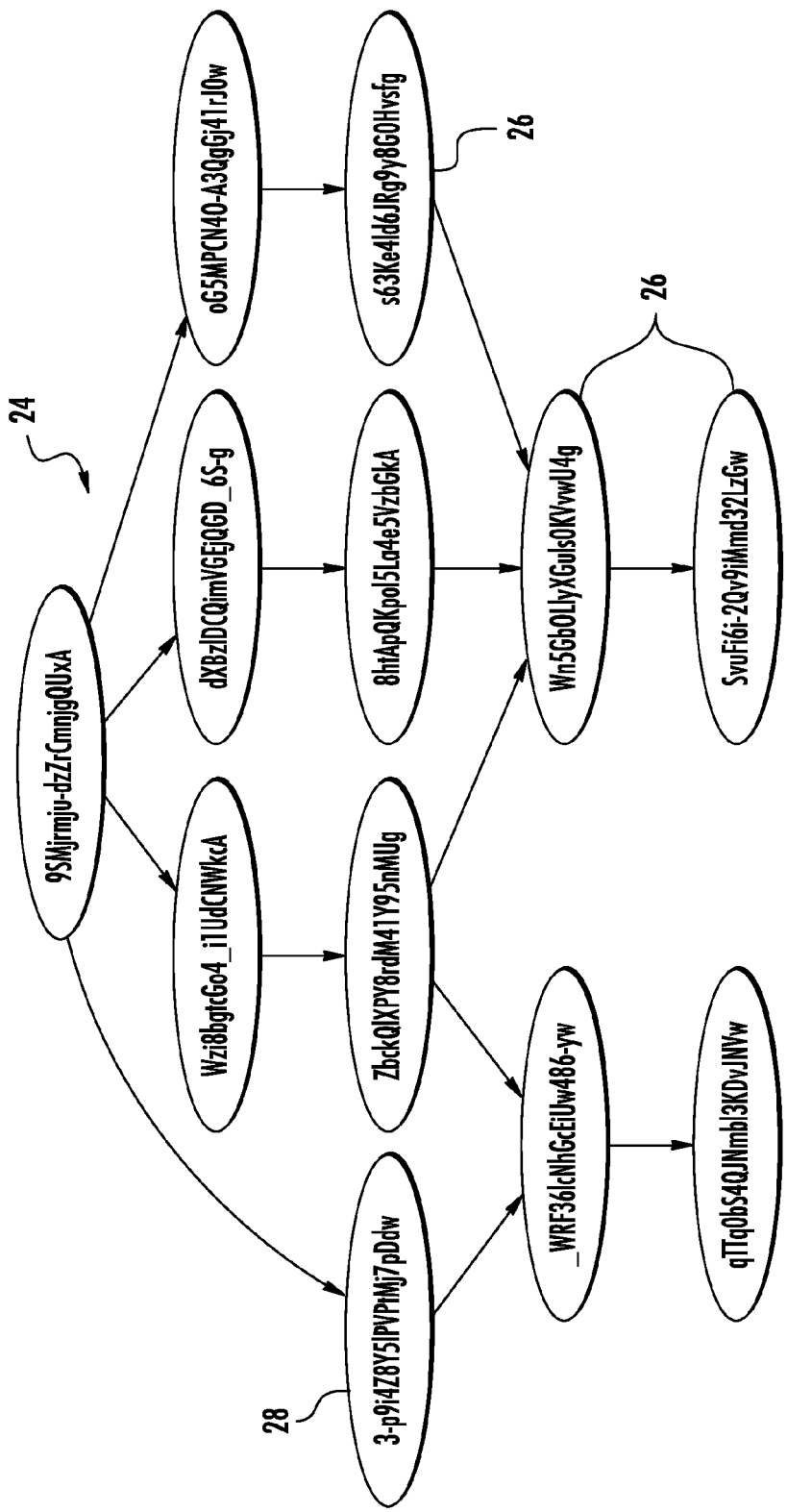
FIG. 2A is a diagrammatical illustration of architecture of partitioned data repository according to the teachings of the present invention.

An example with generated macros for one node of query tree (3-p9i4Z8Y5IPVPtMJ7pDdw) 28 from a generated report query plan of FIG. 2A may include:

```
plan:
    3-p9i4Z8Y5IPVPtMJ7pDdw:
      children:
        - _WRF36lcNhGcEiUw486-yw
      dimensionality: [ ]
      engine: "
    Block (
        PrepareAttr ( ) => ( a1 )
        PrepareBuffer ( _WRF36lcNhGcEiUw486-yw ) => ( col0 )
        Aggr ( [SUM(col0) ] | a1 | ) => ( [m3] | a2 )
        Releasebuffer ( col0 | a1 )
    )
    Reduce ( a2 | [m3] | [SUM] ) => ( a4 | [m5] )
    ReleaseBuffer ( a2 | m3 )
    Write ( [ ] | | 3-p9i4Z8Y5IPVPtMJ7pDdw | 0 | a4 | [m5] )
    ReleaseBuffer ( m5 | a4 )
```

With regard to the aggregation process, following macro instruction tasks, data vectors necessary for a given query are sent into a main memory or local PU memory. The in-memory aggregation process is executed over the report's columns, and may be executed only over the report's columns (corresponding to attributes and facts) which are needed for processing a given query. By way of example, executing in-memory aggregation over only a few reports columnar data requires significantly less data to be transferred into main memory and PU local memory and thus executes the whole process in the order of magnitude faster. Typically in known row-based approaches, an entire table must be scanned, even for just a few columns present in a given report. These columns (defined by keys and values, corresponding to report's attributes and facts) including filter constrain bitmaps are loaded into PU memory for the map phase of the aggregation process. Reduce phases are executed optionally in any optimal PU, depending on nature of the query.

Figure 3:
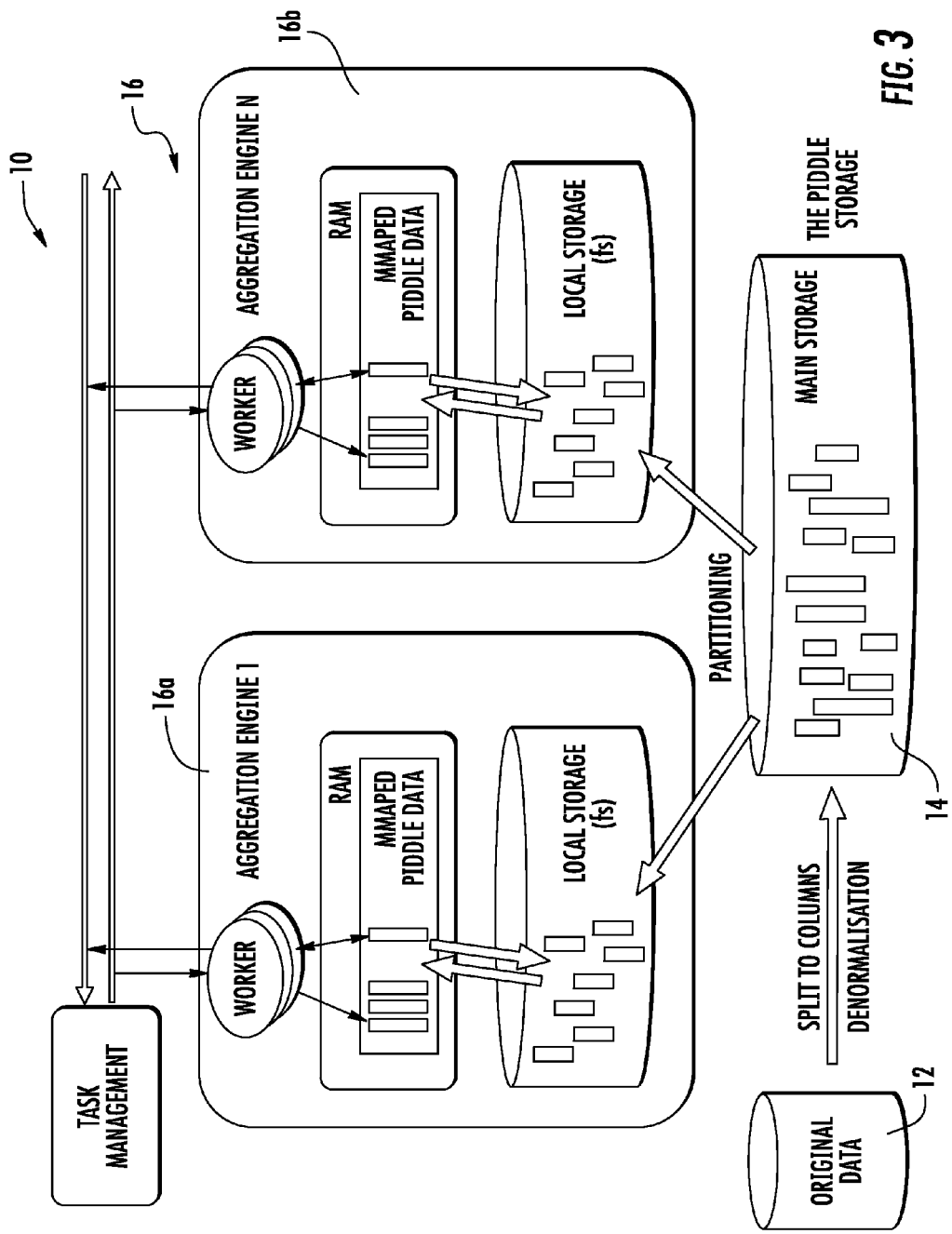
FIG. 3 is a diagrammatical flow diagram illustrating a one pass sort and aggregation process according to the teachings of the present invention in a processing unit massive parallel environment.

By way of further example and with reference to FIG. 3, a desirable feature of the system 10 and associated methods includes having a given ROLAP with IMA installation supporting multiple engines 16a, 16b to increase performance necessary for supporting large number of concurrent users (e.g. Engine 1, Engine 2 . . . . Engine N)

As a result, an in-memory aggregation task can be effectively executed in parallel in hundreds or thousands of computing threads. One CPU 18 may include number of CPU cores in the order of singles or tens, while a current GPU 20 includes from hundreds to thousands cores. Together, they cooperate to crunch through the data in the in-memory aggregation process.

Figure 4:
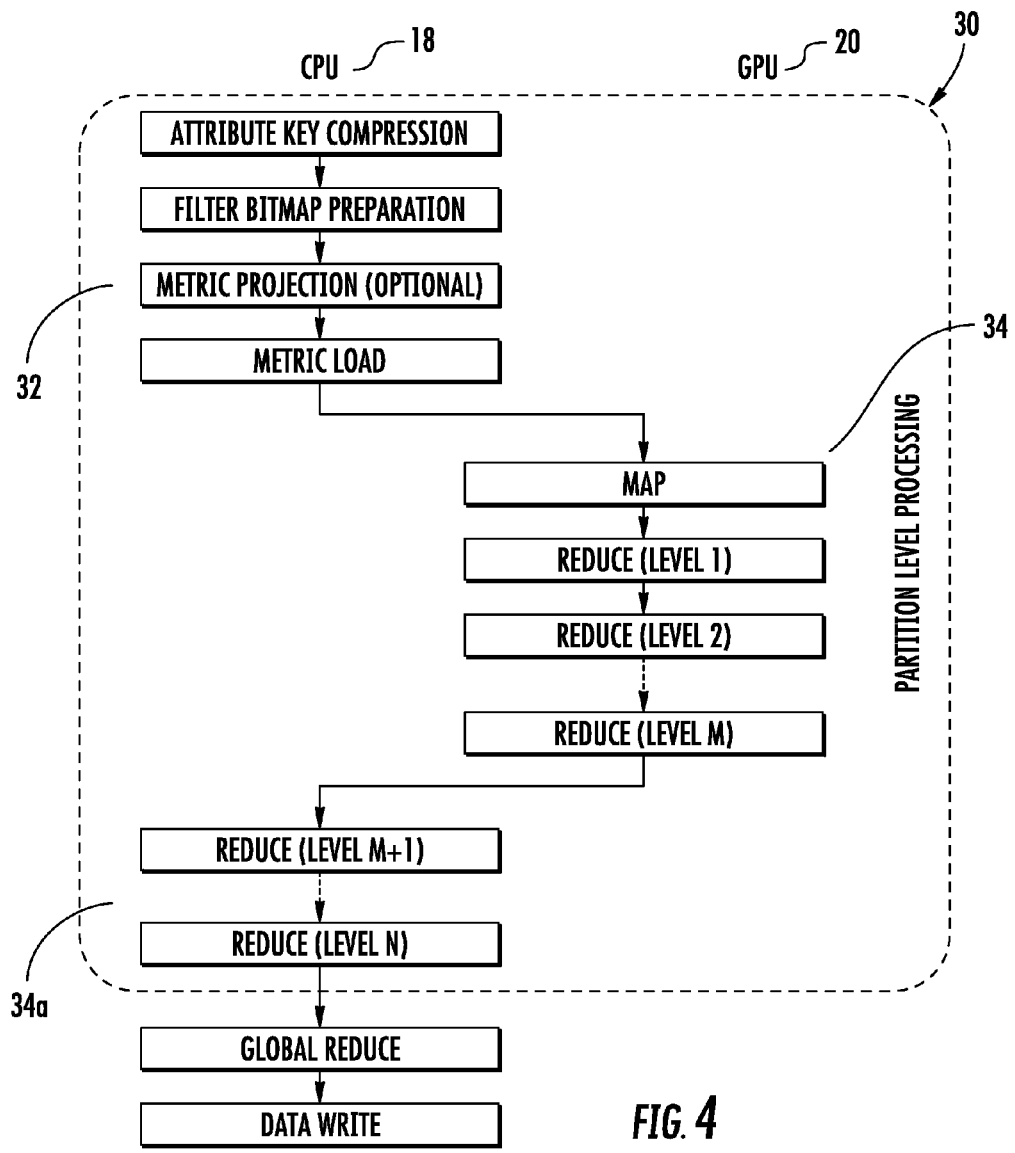
FIG. 4 is a flow chart illustrating an in-memory aggregation process from the point of view of processing unit cooperation according to the teachings of the present invention.

With reference to FIG. 4, solutions provided by embodiments of the present invention allow relatively fast and effective data crunching process due to utilisation of massively parallel processing power of the PU architecture using an OpenCL parallel programming model. By way of example, advantages may be realized in an interoperability of core aggregation code between the GPU 20 and CPU 18. In a partition level processing, a smart aggregation process controller 30 makes decisions at optimal points for the move of reduce phase of aggregation from the GPU 20 subsystem to CPU 18 to achieve a best overall processing time. By way of further example, a final phase (e.g. merging results) is typically executed faster in the CPU 18 than in the GPU 20.

With continued reference to FIG. 4, the aggregation process provides for both key sorting and data aggregation executed during one pass of data processing. Implementation is based on a MapReduce concept. As is known in the art, MapReduce is a programming model for processing large data sets with parallel, distributed algorithms on a cluster. By way of example, a "Map" phase performs compression of attribute keys, filtering of the source records, data typecasting and pre-sorting. These are typically highly granular operations, thus massive parallel GPU environment is a desired environment for such execution. Subsequently the result of the Map phase 32 has to be aggregated by several levels of "Reduce" phases 34. The nature of such processing strongly depends on the character of source data (distribution of keys, level of constrain, output data cardinality). Thus it is difficult to predict optimal strategy of data reduction in advance. A desirable feature and an advantage provided by reduction algorithms of the present invention is an ability to quickly estimate basic data characteristics of semi-processed data after each reduction level and then to allow modification of the next step parameters. One point of interest is proper decision about reduce process execution transferring among multiple PUs. This decision is executed by the system using heuristic algorithm tuned for each PU HW configuration combination on individual basis.

FIG. 4 illustrates the in-memory aggregation process from the point of view of CPU/GPU cooperation, by way of non-limiting example. A processing switch occurs when it is more advantageous to perform an aggregation task by the CPU 18 than on a GPU 20 due to the nature of CPU characteristics (higher CPU clock, more advanced cache and branch handling). This typically happens at the end of the aggregation process 34a, when already largely reduced and partially aggregated data would not able to fully utilize large number of GPU cores. Therefore, the CPU 18 finishes the aggregation process. The system 10 including such a smart switch controller 30 is a unique feature of the in-memory aggregation process for HW acceleration, as herein described.

With regard to the aggregation process in a given PU, when a large amount of data is necessary to be processed, the system takes advantage of the partitioned data. Therefore, the source data (column data vectors) are horizontally partitioned into the data chunks to ensure proper granularity of MapReduce tasks. For the embodiment herein described, each of clusters is processed by the above described process. Aggregation is finished on the most usable PU where partial results from cluster level aggregation are finally "reduced" again, in this case on the CPU.

By way of example with regard to OpenCL, OpenCL allows accessing GPUs for purposes other than graphics. Due to general-purpose GPU (GPGPU) processing, OpenCL is used to program applications which aim is to crunch numbers for aggregation at high speed. OpenCL application for in memory aggregation includes map reducing and data sorting. The in-memory OpenCL application includes a host of applications that run on the CPU and general-purpose routines called kernels that are executed on the OpenCL-compliant device—GPU. With reference again to FIG. 1, illustrating an overall data processing flow, by way of example, OpenCL applications combine CPU and GPU processing for in-memory aggregation process.

By way of further example, the in-memory aggregation code is compatible and can run on GPU and CPU due to the OpenCL API layer that is supported by HW vendors. OpenCL provides a framework for writing programs that execute across heterogeneous platforms consisting of central processing unit (CPUs), graphics processing unit (GPUs), and other processors. OpenCL includes a language (based on C99) for writing kernels (functions that execute on OpenCL devices), plus application programming interfaces (APIs) that are used to define and then control the platforms. OpenCL provides parallel computing using task-based and data-based parallelism. OpenCL provides an open standard.

OpenCL provides the IMA system 10 and associated methods of the present invention access to a graphics processing unit for non-graphical computing. Thus, OpenCL extends the power of the graphics processing. The IMA system takes benefit from automatically compiling OpenCL programs into application-specific processors. The IMA system employs OpenCL code to run on GPU and Intel CPU, by way of example. These standards are cross platform (supported by Intel, Advanced Micro devices (AMD) and Nvidia graphics drivers under Linux, OS X and Windows). An embodiment of the present invention uses the same code for GPU/CGPU types of computing applications without needing to tune its in-memory aggregation system for a specific graphics chipset, using the same application processing interfaces (APIs), since the video chipset vendors' drivers translate the calls to work with the specific graphics chipset.

As above addressed, embodiments according to the teachings of the present invention provide In-Memory Aggregation (IMA) system 10 having a Massive Parallel HW accelerated aggregation engine using in-memory aggregation. As such, a desirable solution based on maximal utilization of HW resources for both the central processing unit (CPU) 18 and any processing unit (PU), such as the GPU 20 herein described by way of example, special coprocessors, and the like subsystems. The PU accelerates BI application performance by massive parallel execution of the compute-intensive tasks of in-memory data aggregation process.

Figure 5:
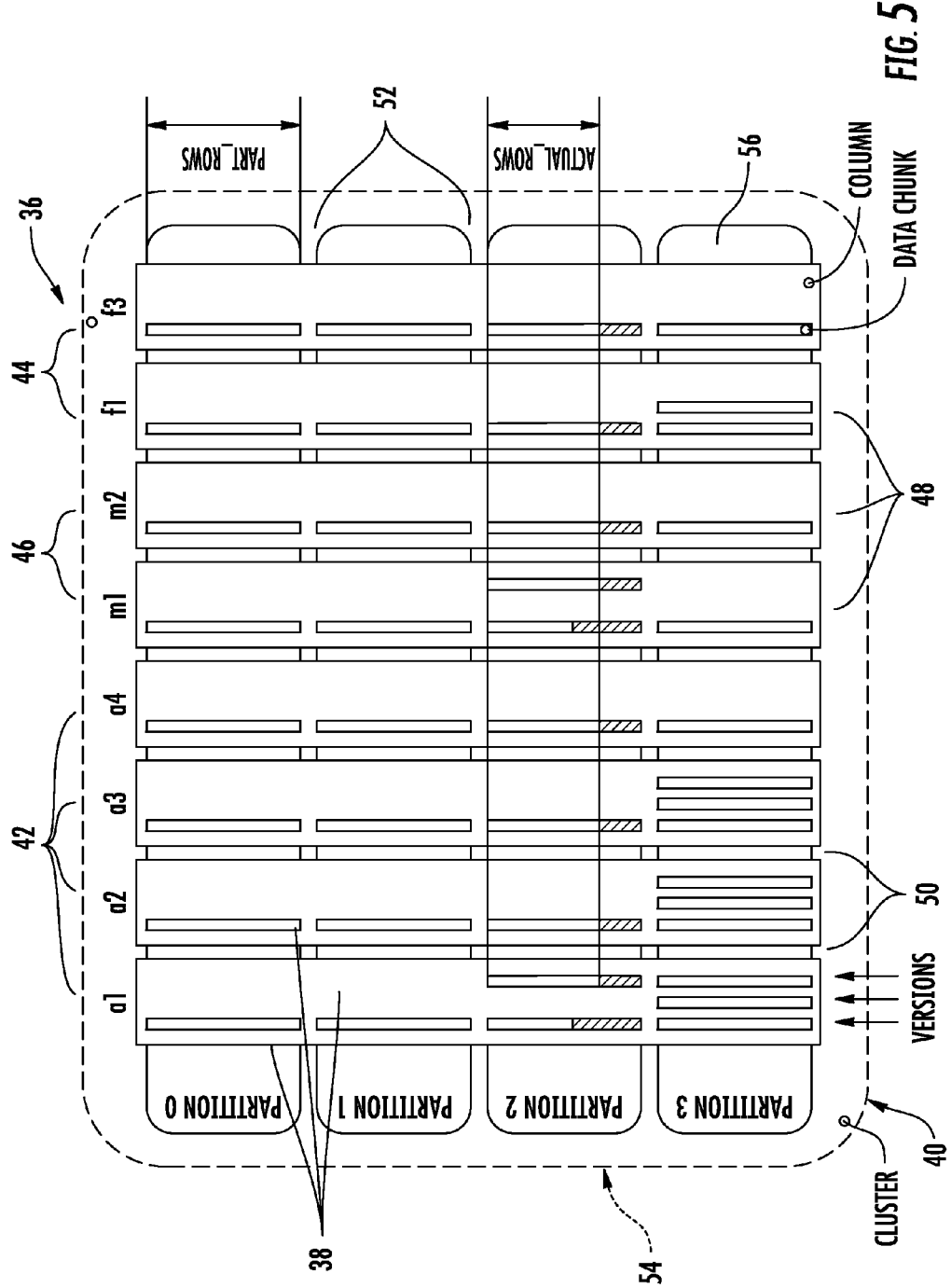
FIG. 5 is a diagrammatical illustration of structure of the data repository according to the teachings of the present invention.

By way of continued example and with reference now to FIG. 5, one embodiment according to the teachings of the present invention is described having a data repository 36 within the data store 14, earlier described with refereed to FIG. 1, wherein:

Source data 38 are stored in a set of data clusters 40. One such cluster 40, as illustrated by way of example with reference to FIG. 5, is diagrammatical illustrates one structure of the data repository 36 according to the teachings of the present invention. By way of example, one cluster 40 of data is herein illustrated representing one multidimensional data space. The cluster 40 stores a set of attributes 42 {a1, a2, a3, a4}, facts 44 {f1, f2} (i.e. original measures existing on this dimensionality) and metrics 46 {m1, m2} (i.e. measures created by projection from another multidimensional spaces). Each data cluster 40 will desirably represents a specific multidimensional data space. From a physical data model perspective, each data cluster 40 contains a set of columns 48. Data are organized in a columnar form physically, wherein the data are vertically partitioned 50. Additionally, each column 48 is horizontally partitioned 52, such that the data cluster 40 contains a mesh 54 of data chunks 56. This approach allows processing of the data in a fully distributed environment (such as a computer cloud). The data chunks 56 are physically stored as standard files using a standard computer file-system.

Further, each of the data chunks 56 can be presented in several versions simultaneously, enabling a concurrent execution of queries against different versions of the data repository 36. Because the data repository 36 is partitioned both horizontally 52 and vertically 50, there is a need for copying only changed data chunks 56. This approach provides a desirably efficient repository space occupation, good cache utilization and low latency for creation of a new data version. Additionally, it enables ability to load a new version of data to the repository without interruption of concurrent reporting services with ensuring atomic switch to the new data version.

From a user perspective, the multidimensional data space (data cluster 40) is described by a logical data model, which, as herein described by way of example, uses only two classes of objects such as the facts 44 and the attributes 42. The facts 44 represent measures on the atomic dimensional level of each available multidimensional data space (that corresponds to above mentioned data cluster 40 on the physical level). The attributes 42 are sets of elements, along which the facts 44 are sorted. The attributes 42 can be organized in hierarchies. Each of such hierarchy, connected to a specific fact 44 (or set of facts), representing one dimension of a multidimensional data space. The number of dimensions is virtually unlimited (limited mostly only by space of physical data repository in a computer cloud). Such an approach to physical data storage architecture ensures there is no impact of the total number of facts, attributes and dimensions to the performance of the certain query (that is affected by actually used objects only).

A new special Analytical Query Language (AQL) is provided for querying of the above mentioned multidimensional data space. The AQL uses logical model objects only, so the AQL query is completely independent of the physical data model and the state of the physical data storage (unlike other solutions based on materialized multidimensional cubes). The AQL is able to describe unlimited number of nested multidimensional data space projections.

Figure 8:
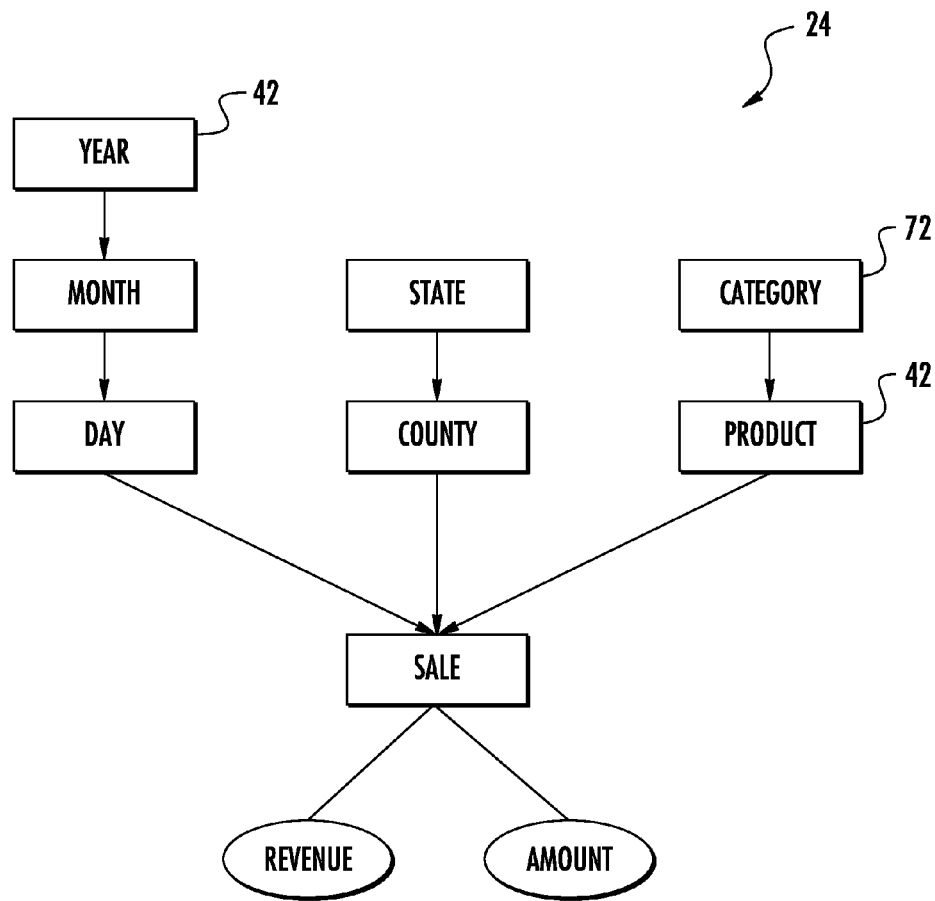
FIG. 8 is diagrammatical illustration of logical model comprising a three dimensional data space by way of example.

As illustrated with reference to FIG. 6, an automated query tree generator provides Logical Query decomposition 58 accordingly to the Logical Data model 24, described with reference to FIG. 8, of the multidimensional data space. The result of projections 60 defines a new multidimensional space which can be used as a source for any future projections. Each multidimensional space is projected along common dimensions, as illustrated with continued reference to FIG. 6, wherein a diagrammatical illustration of multiple projections is presented according to the teachings of the present invention. The example source multidimensional data space SA has dimensionality {A1, A2, A3} and stores facts {f1, f2 . . . fn}. There are two intermediate transformations 62, one to one dimensional space S1 with dimensionality {A1} and second to multidimensional space S2 with dimensionality {A1, A2}. Consequently, spaces S1 and S2 are projected to common a target multidimensional space ST. This example does not address constrain conditions for projections, so we may assume that target multidimensional space ST has generally different constrain definition than S2.

The queries are organized to a virtually unlimited acyclic directed graph, as above described with reference to FIG. 2A. The sub graph of such graph connected to one root node is herein technically referred to as a Query Tree. This query tree can be optimized (pruned) using rules for union of the projection operations. The root node of such tree represents the multidimensional report result.

The described decomposition approach in conjunction with above mentioned physical data storage architecture enables efficient caching of already projected multidimensional data spaces. This way, the physical data storage is dynamically expanded and allows subsequent run-time optimization of future queries. It is also possible to materialize some multidimensional subspaces in advance to optimize efficiency of execution huge sets of similar reports in batch mode.

Each node of the above mentioned Query Tree is transformed into a Macro Language, which represents the physical execution plan of the particular multidimensional data space projection. The Macro code is parallelized to be able to effectively utilize distributed (cloud) computing system. The parallelized macro language is then distributed to task queues of the desired cloud nodes, where is subsequently transformed into the low-level execution code.

Physical task execution is based on a MapReduce programming model to allow massive parallel execution with good scalability. There are several basic desirable operations to ensure the above describe projections of the multidimensional data space including, by way of example: 1) selection of the source data accordingly to a specified constrain; 2) arithmetic operations and functions with the data on the atomic level of the source multidimensional data space; and 3) change of the dimensionality of the atomic level data to be able to project them to the target multidimensional data space.

Examples 1 and 2 typically fall to Map phase and covers number of basic operations such compression of attribute keys, generation of constrain bitmaps, filtering of the source records, data typecasting and arithmetic operations with source data on the level of original data space dimensionality. Example 3 is accomplished during the Reduce phase. The operation is a grouping of the fact data accordingly to values of the keys with application of the aggregation function (such e.g. SUM, MIN, MAX).

Figure 7:
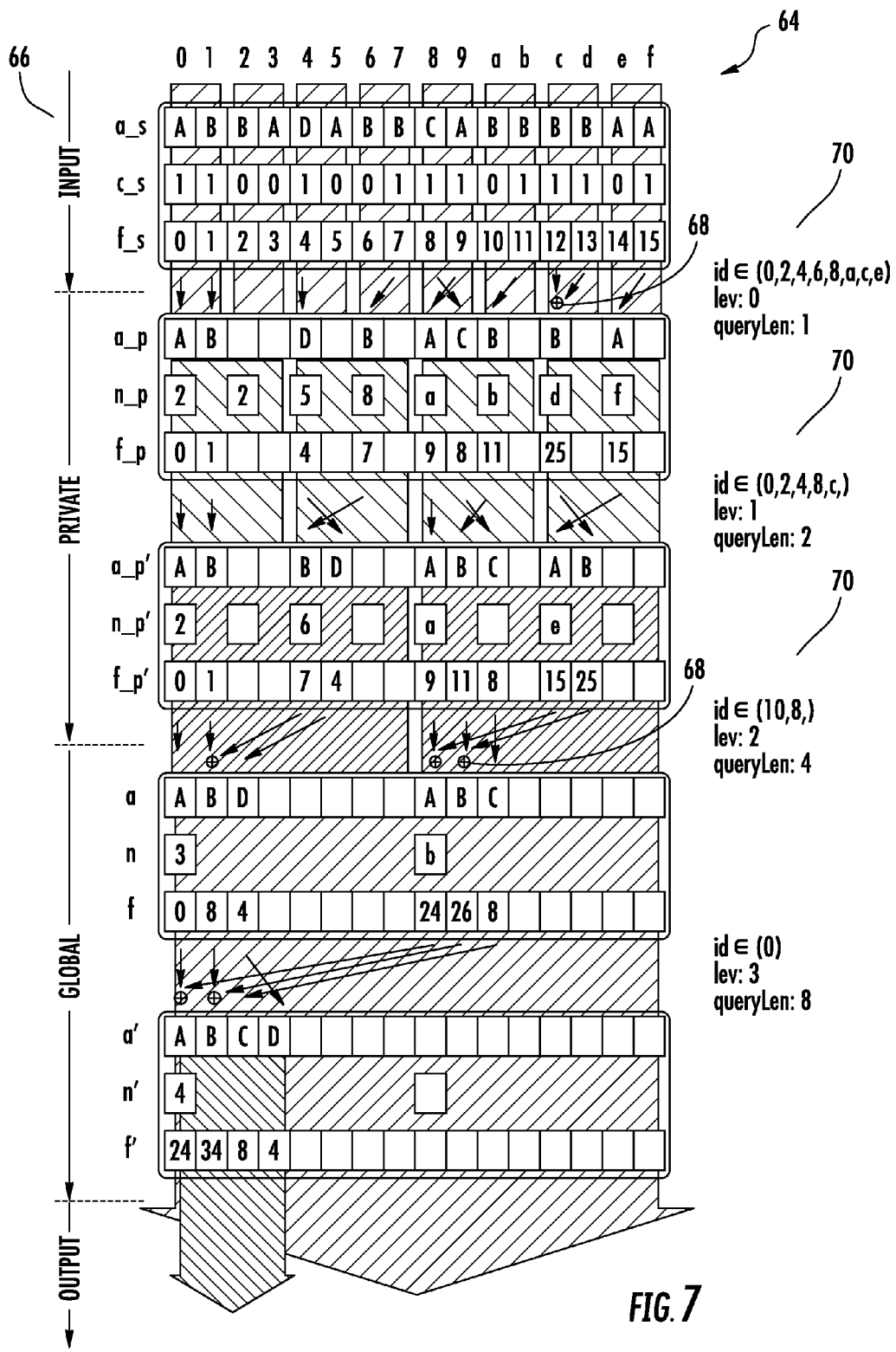
FIG. 7 is a diagrammatical illustration showing a MapReduce process used for multidimensional data space projection according to the teachings of the present invention.

One algorithm, as diagrammatically illustrated by way of example with reference to FIG. 7, is herein presented with respect to CPU cache utilization, asymptotic complexity of the algorithm and ability to massive parallel execution. Each reduction level ensures sorted order of resulting keys, so a fast sort merge algorithm can be used on any level of reduction (even on macro level to merge results of data chunks between distinct physical cloud nodes). One approach, herein described by way of example, is suitable for use in computing environment containing massive parallel co-processors, because parameters of reduce process (e.g. number of concurrent threads, volume of data processed per thread etc.) can be optimized accordingly to characteristics of both computing system and processed data. This way the process can be executed in non-uniform hardware cloud as well.

FIG. 7 is a diagrammatical illustration showing one MapReduce process 64 used for multidimensional data space projection according to the teachings of the present invention. The area labeled "input" 66 contains source data vectors: a_s is a vector of compressed keys, c_s is a bitmap representing constrain (defining which data sublet is intended for processing in particular projection) and f_s is a vector of facts. Even though the example herein described contains only one fact vector, it will be understood that it is possible to process a number of fact vectors in parallel. The "input" data are processed in Map phase 32 in parallel. Subsequently, prepared data are processed in Reduction phase 34 divided into one or more levels, as earlier described with reference to FIG. 4. The source data vectors for each Reduction level are split into data chunks, started with chunk length 2 and consequently increased by power of 2 for each reduction level. The chunks 56 are joined together utilizing a sort merge algorithm. The example herein presented illustrates how data are joined. The plus sign in circle (+) represents an application of the aggregation function 68. Each reduction level 70 creates a set of vectors containing vectors of keys a_p and facts f_p (with same meaning as key vector in input space) plus special vector n_p containing number of elements in each processed chunks of vectors.

All reduction levels use the same algorithm. By way of example, the reduction levels are technically split into sets and may be named "private" (covers reduction in scope of one CPU thread), "global" (covers reduction on one cloud node) and "macro" (not shown in drawing, intention of this is to reduce data between physical nodes of computing cloud).

With respect to utilization of hardware resources the algorithm works with two sets (banks) of reduce level vectors, each reduction level takes one as source and one as target, when subsequent level uses it in the opposite meaning.

To provide one specific example and further explanation regarding query decomposition and data space projections, reference is again made to FIG. 8, wherein one logical model 24, herein comprises a three dimensional data space 72, containing values of revenue and amount of the sales (represented by objects of the class fact), measured as divided by days, county and product (represented by objects of the class attribute, as earlier described). These three attributes 42 are called atomic attributes, because they are defining an atomic level of the facts (i.e. level with higher available granularity of the facts). There are other attributes (month, year, state, category), which are in hierarchical connection to atomic attributes.

With regard to the data repository, the data are stored in data files, each attribute or fact is stored in an independent column in the data cluster. The columns a1, a2 and a3, as illustrated with reference again to FIG. 5 correspond to attributes 42: day, year and category. The columns f1 in the FIG. 5 corresponds to facts 44 for revenue. As herein illustrated by way of example, the data cluster 40 is split into four partitions, so each column is stored in four data chunks 56 (i.e. independent data files).

With regard to the query, the example task is to show a contribution (in percent) of the product category revenue to the total annual revenue divided by year and product category. The corresponding query in AQL language (as above described) is:

SUM(revenue)/(SUM(revenue) DICE year IGNORE ALL)*100 DICE year, category, where: revenue is the fact object; year and category are attribute objects; SUM is the aggregation function defining way, how data will be projected from one multidimensional space to another. In this case it means, that data falling into one category (i.e. under one attribute element) in the target space has to me summarized; and DICE is a keyword introducing definition of the target data space (year and category in this example). The expression in the denominator has the DICE clause in form "DICE year IGNORE ALL." This means that a summary of the revenue in the denominator has to be projected to data subspace with exactly defined dimensions only (the year only in this example). Thus, the DICE definition from the outer level ("DICE year, category" in this example) will have no effect for computation of the denominator. On the other side, the numerator has no such specific definition, so it will be projected to data space defined by outer level DICE definition (year and category in this example).

Figure 9:
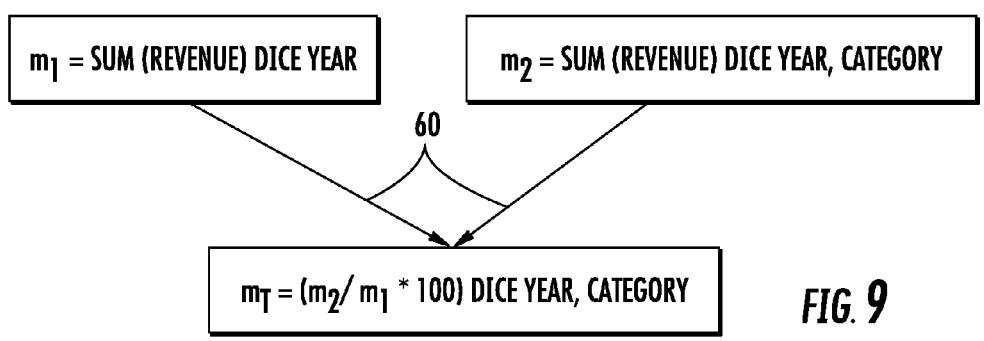
FIG. 9 is a flow chart illustrating one example of query decomposition, wherein the query decomposition is divided into two projections from source data space, by way of example.

With regard to query decomposition, it is desirable to make a decomposition of the above mentioned example query into two particular projections 60 from the source data space, as illustrated with referee to FIG. 9. The process of projections is illustrated herein by way of example with reference to FIG. 10, where SA is a source data space, and where f1, f2 ... fn are revenue values divided by days, county and product. There are also attributes month, year, state and category, hierarchically connected to these atomic attributes, as above described with reference to FIG. 8.

Figure 10:
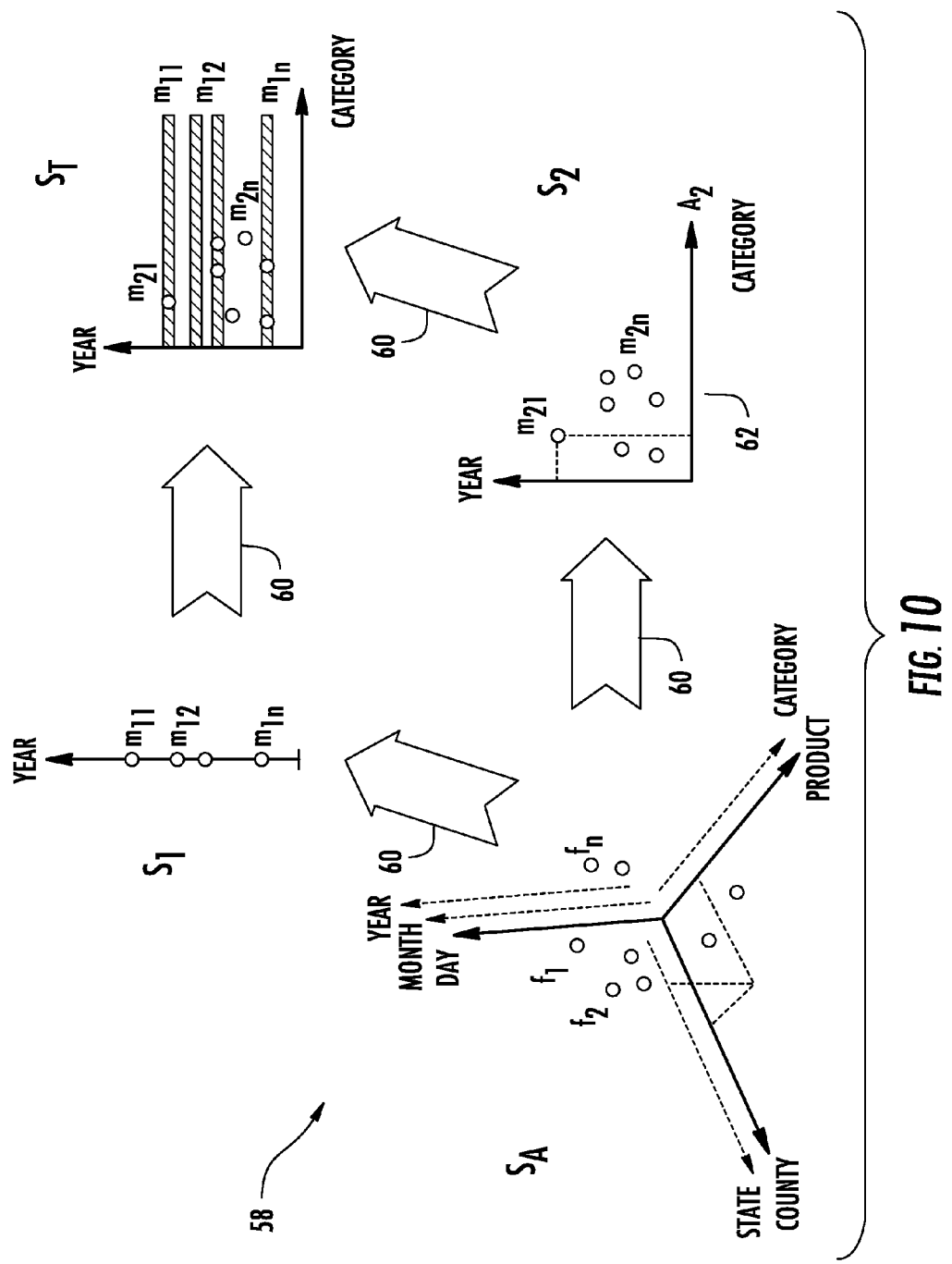
FIG. 10 is an example of the diagrammatical illustration of multiple projections, as presented in FIG. 6, wherein SA is a source data space, and wherein f1, f2 . . . fn are revenue values divided by days, county and product.

As earlier described with reference to FIG. 6, and with continued reference to FIG. 10, S1 is a particular intermediate data space with one dimension of attribute year, where m11, m12 ... m1n are values of metric m1, which represents a projection of source fact revenue to this data space. The projection 60 is accomplished by summarization of set of source fact values falling to groups divided by particular years. S2 is a particular intermediate data space with two dimensions of attributes year and category, where m21, m22 ... m2n are values of metric m2, which represents a projection of source fact revenue to this data space. The projection is accomplished by summarization of set of source fact values falling to groups divided by particular years and categories. ST is a target data space which is a projection of subspaces S1 and S2 to common multidimensional data space with dimensions of attributes year and category. m11, m12 ... m1n and m21, m22 ... m2n has the same meaning as described above for subspaces S1 and S2. The projection of the m1 is shown as hatched bars in the drawing. Because values are projected from one dimensional data space S1 to two dimensional target space, values of m1 do not depend on the category dimension in this example.

Figure 6:
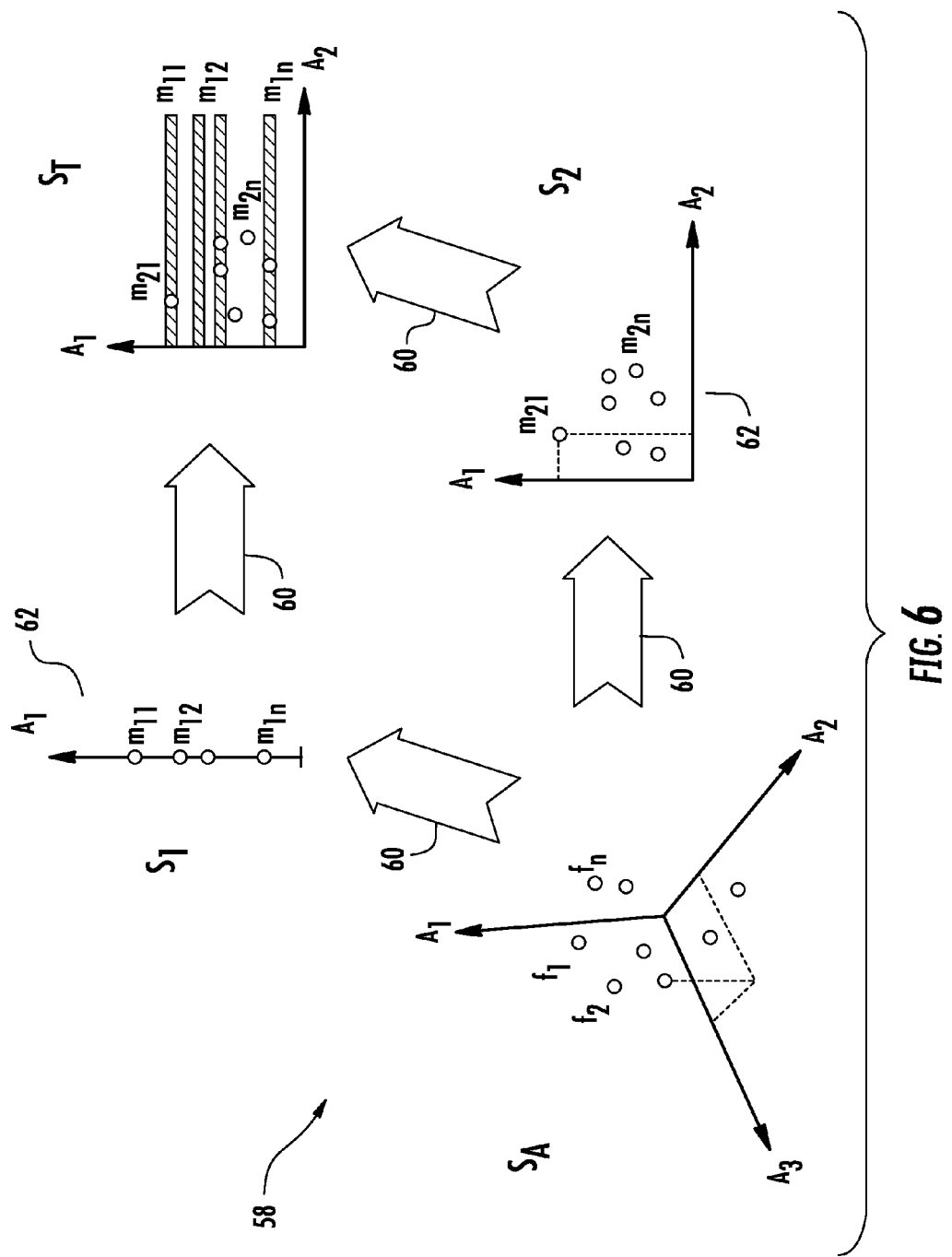
FIG. 6 is a diagrammatical illustration of multiple projections according to the teachings of the present invention.

A final step of the query is an arithmetic operation m1/m2*100 (not shown in the FIG. 6).

Figure 11:
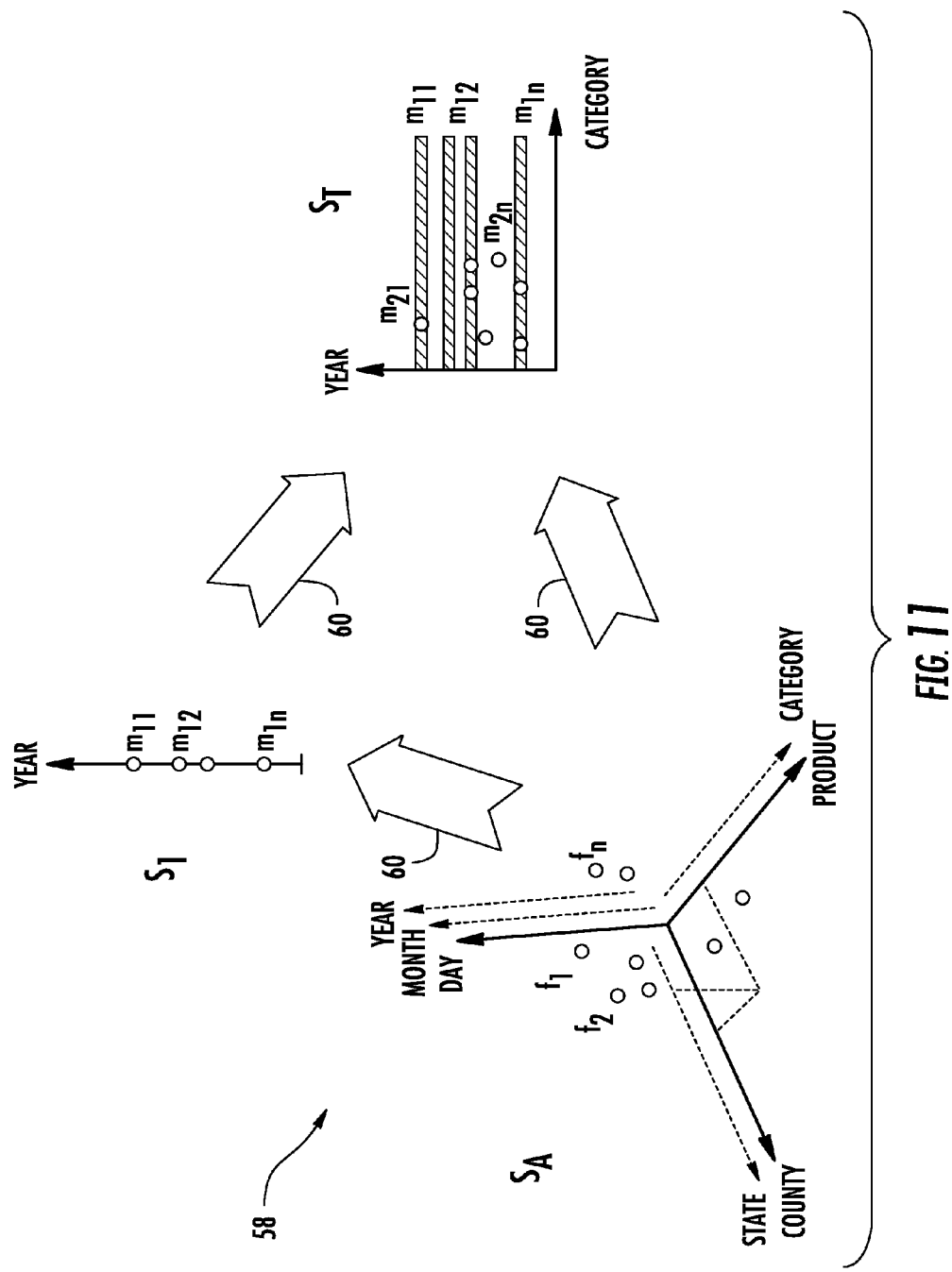
FIG. 11 further illustrates one decomposition example similar to FIG. 10 for a specific case, wherein the query does not contain a definition of constrain, and thus a projection plan can be simplified.

For simplicity, and by way of further example, the example herein described does not contain a definition of constrain (i.e. definition of the subset of the source fact values selected for processing). Therefore, the subspace S2 is identical to the target data space ST, so S2 can be treated as ST, thus decomposition can be simplified as illustrated with reference to shown in FIG. 11.

Further, it will be understood by those of skill in the art that flowcharts and block diagrams herein described may illustrate architecture, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. Further, some implementations may include the functions in the blocks occurring out of the order as herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram. These computer program instructions may also be stored in a computer readable medium that may direct a computer, other programmable data processing apparatus, or other devices to function in a particular manner, such that the instructions stored in the computer readable medium produce an article of manufacture including instructions which implement the function or act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of various embodiments as herein presented, by way of example, may be embodied as a system, method or computer program product, and accordingly may take the form of a hardware embodiment, a software embodiment (including firmware, resident software, micro-code, and the like) or a combination thereof that may generally be referred to as a circuit, module or system. Furthermore, aspects of various embodiments may take the form of a computer program product embodied in one or more computer readable media having computer readable program code embodied thereon.

It is understood that a computer implemented method as may herein be described operates with readable media relating to non-transitory media, wherein the non-transitory computer-readable media comprise all computer-readable media, with the sole exception being a transitory, propagating signal.

Any combination of one or more computer readable media may be utilized. A computer readable medium may be a computer readable signal medium or a computer readable storage medium. A computer readable storage medium may be, by way of non-limiting example, an electronic, magnetic, optical, electromagnetic, infrared, or semiconductor system, apparatus, or device, or any suitable combination of the foregoing. More specific non-limiting examples of the computer readable storage medium may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination thereof. Computer program code for carrying out operations for aspects of various embodiments may be written in any combination of one or more programming languages, including an object oriented programming language such as Java, Smalltalk, C++ or the like and conventional procedural programming languages, such as the C programming language or similar programming languages. The program code may also be written in a specialized language. The program code may execute entirely on the user's computer, partly on the user's computer, as a stand-alone software package, partly on the user's computer and partly on a remote computer, or entirely on the remote computer or server. The remote computer may be connected to the user's computer through any type of network, including a local area network (LAN) or a wide area network (WAN), or the connection may be made to an external computer, by way of non-limiting example, through the Internet using an Internet Service Provider.

Although the invention has been described relative to various selected embodiments herein presented by way of example, there are numerous variations and modifications that will be readily apparent to those skilled in the art in light of the above teachings. It is therefore to be understood that, within the scope of claims supported by this specification, the invention may be practiced other than as specifically described.

That which is claimed is:

1. A computer-implemented method for executing a query of a multidimensional data space, the method comprising:
   storing source data in a data repository;
   forming a data cluster representing a multidimensional data space, wherein the data are vertically and horizontally partitioned to form a mesh of data chunks for processing of the data in a fully distributed environment;
   storing the data chunks as standard files using a standard computer file system;
   presenting the data chunks in several versions simultaneously for enabling concurrent execution of queries with different versions of the data repository;
   copying only changed data chunks, thus resulting in an efficient data repository space occupation, cache utilization and ease in creating a new data version;
   loading the new data version into the data repository without interruption of concurrent reporting services with an ensuring atomic switching to the new data version;

describing the multidimensional data space using multiple classes of logical model objects including facts and attributes;

organizing the attributes in hierarchies, wherein each hierarchy is connected to a specific fact or set of facts, representing one dimension of a multidimensional data space;

providing an analytical query language for querying the multidimensional data space, wherein the analytical query language uses only the logical model objects, and wherein the analytical query language describes an unlimited number of nested multidimensional data space projections;

generating a query tree for providing a logical query decomposition the multidimensional data space, wherein a projection defines a new multidimensional space used as a source for a future projection;

projecting each of the multidimensional space data to common dimensions;

organizing queries to an acyclic directed graph, wherein a sub graph of the acyclic graph is connected to one root node of the query tree, wherein the query tree is optimized using rules for union of the projections, wherein the root node of the query tree represents the multidimensional report result, wherein the decomposition in conjunction with physical data storage architecture enables efficient caching of the projected multidimensional data spaces, and wherein the physical data storage is dynamically expanded allowing subsequent run-time optimization of future queries;

transforming each node of the query tree into a macro language representing a physical execution plan of the multidimensional data space projection, wherein macro code is parallelized for effectively utilizing a distributed computing system;

distributing the parallelized macro language task queues of desired cloud nodes, wherein the macro language is subsequently transformed into a low-level execution code; and executing a physical task based on a MapReduce programming model to allow massive parallel execution with scalability.

2. The computer-implemented method according to claim 1, wherein executing the MapReduce programming model includes projecting the multidimensional data space by selecting the source data according to a specified constrain, operating on atomic level data of the source multidimensional data space, and changing the dimensionality of the atomic level data for projecting the atomic level data to the multidimensional data space.

3. The computer-implemented method according to claim 2, wherein the selecting and operating comprise compressing attribute keys, generating constrain bitmaps, filtering source records, data typecasting and arithmetic operations with source data on the level of original data space dimensionality.

4. The computer-implemented method according to claim 1, wherein executing the MapReduce programming model comprises:

representing the source data as data vectors including a first vector of compressed keys, a second vector of a bitmap representing constrain defining which data sublet is intended for processing in the projection, and a third vector of facts;

processing the data in a map phase in parallel, wherein prepared data are processed in a reduction phase divided into one or more levels, the source data vectors for each reduction level being split into the data chunks, starting with a chunk length and consequently increased by a power of two for each reduction level;

joining the data chunks together utilizing a sort merge process including an application of an aggregation function, wherein each reduction level creates a set of vectors containing the vectors of keys and facts, and a special vector containing a number of elements in each processed chunk of vectors;

organizing the data into sets including private for a reduction in scope of one processing unit thread, global for a reduction of one cloud node, and macro to reduce data between physical nodes of a computing cloud; and providing sets of reduce level vectors, wherein each reduction level vector includes a source and a target.

5. The computer-implemented method according to claim 1, wherein the facts represent measures on an atomic dimensional level of each available multidimensional data space that corresponds to the data cluster on the physical level, and wherein attributes are sets of elements along which the facts are sorted.

6. The computer-implemented method according to claim 5, wherein a number of dimensions is limited only by space of the physical data repository in a computer cloud, thus ensuring the number of facts, attributes and dimensions have no impact on performance of the query.

7. The computer-implemented method according to claim 1, wherein the analytical query language uses only the logical model objects, thus maintaining the analytical query language query to be completely independent of the physical data model and state of the physical data storage, and wherein the analytical query language describes an unlimited number of nested multidimensional data space projections.

8. The computer-implemented method according to claim 1, wherein one logical model comprises a multidimensional data space containing values represented by objects of the facts and the attributes, wherein the data are stored in data files having each attribute and fact stored in an independent column in the data cluster.

9. The computer-implemented method according to claim 1, wherein the logical query decomposition comprises forming at least one projection from the source data space.

10. A computer-implemented method for executing a query of a multidimensional data space, the method comprising:

storing source data in a data repository comprising a set of data clusters, wherein each data cluster represents a multidimensional data space;

providing a physical data model, wherein each data cluster contains a set of columns having the data organized in a columnar form physically, thus the data are vertically partitioned, and wherein each column is further partitioned horizontally, such that one data cluster contains a mesh of data chunks for processing of the data in a fully distributed environment such as a computer cloud;

storing the data chunks as standard files using a standard computer file system;

presenting the data chunks in several versions simultaneously for enabling concurrent execution of queries with different versions of the data repository;

copying only changed data chunks, thus resulting in an efficient data repository space occupation, cache utilization and ease in creating a new data version;

loading the new data version into the data repository without interruption of concurrent reporting services with an ensuring atomic switching to the new data version;

describing the multidimensional data space by a logical data model using multiple classes of logical model objects including facts and attributes, wherein the facts represent measures on an atomic dimensional level of each available multidimensional data space that corresponds to the data cluster on the physical level, and wherein attributes are sets of elements along which the facts are sorted;

organizing the attributes in hierarchies, wherein each hierarchy is connected to a specific fact or set of facts, representing one dimension of a multidimensional data space, wherein a number of dimensions is limited only by space of the physical data repository in the computer cloud, thus ensuring the number of facts, attributes and dimensions have no impact on performance of the query;

providing an analytical query language for querying the multidimensional data space, wherein the analytical query language uses only the logical model objects, thus maintaining the analytical query language query to be completely independent of the physical data model and state of the physical data storage, and wherein the analytical query language describes an unlimited number of nested multidimensional data space projections;

generating an automated query tree for providing a logical query decomposition accordingly to the logical data model of the multidimensional data space, wherein a projection defines a new multidimensional space used as a source for a future projection;

projecting each of the multidimensional space data to common dimensions;

organizing queries to an acyclic directed graph, wherein a sub graph of the acyclic graph is connected to one root node of the query tree, wherein the query tree is optimized using rules for union of the projections, wherein the root node of the Query Tree represents the multidimensional report result, wherein the decomposition in conjunction with the physical data storage architecture enables efficient caching of the projected multidimensional data spaces, and wherein the physical data storage is dynamically expanded allowing subsequent run-time optimization of future queries;

transforming each node of the query tree into a macro language representing a physical execution plan of the multidimensional data space projection, wherein macro code is parallelized for effectively utilizing a distributed computing system;

distributing the parallelized macro language task queues of desired cloud nodes, wherein the macro language is subsequently transformed into a low-level execution code; and executing a physical task based on a MapReduce programming model to allow massive parallel execution with scalability, wherein the projecting of the multidimensional data space includes:
  selecting the source data according to a specified constrain;
  operating on the data arithmetically and functionally on atomic level data of the source multidimensional data space; and
  changing the dimensionality of the atomic level data for projecting the atomic level data to the multidimensional data space.

11. The computer-implemented method according to claim 10, wherein the data cluster comprises data stored in columnar form and partitioned horizontally to form a plurality of data chunks, each data chunk stored as a data file.

12. The computer-implemented method according to claim 10, further comprising materializing a preselected set of multidimensional subspaces in advance to optimize efficiency of execution of sets of reports in a batch mode.

13. The computer-implemented method according to claim 10, wherein the selecting and operating steps comprise compressing attribute keys, generating constrain bitmaps, filtering source records, data typecasting and arithmetic operations with source data on the level of original data space dimensionality.

14. The computer-implemented method according to claim 10, wherein the changing comprises grouping of fact data accordingly to values of the keys with application of an aggregation function including at least one of, and not limited to, SUM, MIN, and MAX.

15. The computer-implemented method according to claim 10, wherein executing the MapReduce programming model comprises:
  representing the source data as data vectors including a first vector of compressed keys, a second vector of a bitmap representing constrain defining which data sublet is intended for processing in the projection, and a third vector of facts;
  processing the data in a map phase in parallel, wherein prepared data are processed in a reduction phase divided into one or more levels, the source data vectors for each reduction level being split into the data chunks, starting with a chunk length and consequently increased by a power of two for each reduction level;
  joining the data chunks together utilizing a sort merge process including an application of an aggregation function, wherein each reduction level creates a set of vectors containing the vectors of keys and facts, and a special vector containing a number of elements in each processed chunk of vectors;
  organizing the data into sets including private for a reduction in scope of one processing unit thread, global for a reduction of one cloud node, and macro to reduce data between physical nodes of the computing cloud; and
  providing sets of reduce level vectors, wherein each reduction level vector includes a source and a target.

16. The computer-implemented method according to claim 10, wherein one logical model comprises a three dimensional data space containing values represented by objects of the facts and the attributes, wherein the data are stored in data files having each attribute and fact stored in an independent column in the data cluster.

17. The computer-implemented method according to claim 10, wherein a query in the analytical query language comprises fact object and an attribute object.

18. The computer-implemented method according to claim 10, wherein the logical query decomposition comprises forming at least two projections from the source data space.

19. A computer-implemented method for executing a query of a multidimensional data space, the method comprising:
  storing data in columnar form in a file system of a data processing computer;
  partitioning the data in the columnar form horizontally and vertically to allow the data to be processed in a fully distributed environment;
  providing an analytical query language operable for multidimensional data analysis;
  providing an automated query generator for query tree decomposition according to a logical data model, wherein the automated query generator provides a transformation of multidimensional subspaces into a macro language representing a physical execution plan of a projection of metrics into multidimensional subspaces defined by an ad-hoc report;

automatically decomposing a query into logical multidimensional objects, wherein each object defines a specific subspace of the multidimensional space;

optimizing the query using algebraic and heuristic rules, wherein the query decomposition represents a report image in the overall multidimensional space;

optimizing a solution by the decomposition optimized for denormalized data stored in the columnar storage;

transforming the macro language into a hardware accelerated execution code for supporting massive parallel processing within a single system or within a cloud; and parallel processing aggregation tasks across computers operable in the cloud for providing big data analysis, wherein individual work stations are assigned individual roles including data crunching, metadata serving, and aggregation task supervising and controlling.

20. The computer-implemented method according to claim 19, wherein the data crunching comprises multiple workstations operable for processing data aggregation tasks on a processing unit, and wherein the multiple workstations support scalability requirements for supporting concurrent user communities while still maintaining response time for ad hoc reports.

21. The computer-implemented method according to claim 20, wherein a metadata server provides performance support for graphical user interface applications to search for business metadata objects, wherein such separation results in no performance degradation on the workstations.

22. The computer-implemented method according to claim 19, wherein the aggregation tasks supervising and controlling comprises query management and distribution tasks placed on a dedicated server for allowing further scalability supporting users on the computer cloud.

* * * * *